United States Patent [19]

Vassiliou

[11] 4,054,704

[45] Oct. 18, 1977

[54] PROCESS FOR DECORATING COATINGS PRODUCED BY HEAT-STABLE POLYMER COMPOSITIONS

[75] Inventor: Eustathios Vassiliou, Newark, Del.

[73] Assignee: E. I. Du Pont de Nemours and Company, Wilmington, Del.

[21] Appl. No.: 606,296

[22] Filed: Aug. 22, 1975

Related U.S. Application Data

[63] Continuation-in-part of Ser. No. 509,936, Sept. 27, 1974, abandoned, and a continuation-in-part of Ser. No. 552,872, Feb. 25, 1975, abandoned, which is a continuation-in-part of Ser. No. 509,936.

[51] Int. Cl.$^2$ .......................... B32B 310; B32B 27/00; B05D 3/02
[52] U.S. Cl. ............................. 428/201; 427/145; 427/258; 427/261; 427/278; 427/302; 427/333; 427/340; 427/341; 427/385 B; 427/385 A; 427/385 R; 427/388 R; 427/399; 427/400; 428/199; 428/204; 428/207; 428/209; 428/203; 428/411; 428/419; 428/420; 428/422; 428/426; 428/432; 428/435; 428/457; 428/458; 428/470; 428/474

[58] Field of Search ............... 427/258, 261, 385, 387, 427/340, 341, 256, 400, 333, 302, 278, 399, 385 B, 385 R, 385 A, 145; 428/422, 470, 913, 420, 199, 201, 207, 209, 203, 204, 411, 419, 457, 458, 474, 426, 432, 435

[56] References Cited

U.S. PATENT DOCUMENTS

| | | | |
|---|---|---|---|
| 2,866,765 | 12/1958 | Smith | 428/422 |
| 2,961,341 | 11/1960 | Long | 428/422 |
| 2,979,418 | 4/1961 | Dipner | 428/422 |
| 3,470,014 | 9/1969 | Kublitz | 428/422 |
| 3,473,949 | 10/1969 | Eldred | 427/302 |
| 3,489,595 | 1/1970 | Brown | 428/422 |
| 3,493,418 | 2/1970 | Amano | 428/207 |
| 3,526,532 | 9/1970 | Heiberger | 428/422 |
| 3,577,257 | 5/1971 | Hutzler | 427/333 |
| 3,692,558 | 9/1972 | Werner | 428/422 |
| 3,833,401 | 9/1974 | Ingram | 427/256 |

*Primary Examiner*—Ellis Robinson

[57] ABSTRACT

The appearance of a heat-stable polymer coating is enhanced by a process which produces a decorative pattern within a coating produced by a heat-stable polymer coating composition. The process consists of applying a heat-stable polymer composition as a subsequent coat over or directly under an antioxidant composition which diffuses into the heat-stable polymer coating composition and renders the pattern visible, upon baking, within the baked coat produced by the coating composition.

16 Claims, No Drawings

PROCESS FOR DECORATING COATINGS PRODUCED BY HEAT-STABLE POLYMER COMPOSITIONS

CROSS-REFERENCE TO RELATED APPLICATION

This application is a Continuation-in-Part of copending Application Ser. No. 509,936, filed Sept. 27, 1974, and a Continuation-in-Part of copending Application Ser. No. 552,872, filed Feb. 25, 1975, which itself is a Continuation-in-Part of Application Ser. No. 509,936, all of which are now abandoned.

BACKGROUND OF THE INVENTION

1. Field of Invention

This invention relates to a process which renders a decorative pattern visible within a coating produced by a heat-stable polymer coating composition.

2. Prior Art

Articles coated with heat-stable polymer compositions of various types have come into widespread use in recent years. Heat-stable polymer coated articles are useful for purposes requiring or aided by a heat-stable surface. Especially useful are heat-stable polymer coating compositions which provide lubricious surfaces. The uses of coated articles having lubricious surfaces range from bearings to ship bottoms and from iron soleplates to ice cube trays.

To achieve maximum consumer demand for an article consumer expectations must be met. One consumer expectation is to have a product which is pleasing to his or her aesthetic sense and which is capable of maintaining this pleasing effect throughout the product's useful life.

The process of this invention produces a decorative pattern visible within coatings produced by a heat-stable polymer coating composition, thereby achieving this consumer expectation.

Decorative areas of the coating wear as well as non-decorative areas for the following reasons. The decorative pattern extends through the entire thickness of the coating; therefore, as the coating is worn thinner, the decorative pattern is still present. Concentration of heat-stable polymer is uniform throughout the coating, i.e., the decorative and non-decorative areas; therefore, the coating has uniform heat-stability throughout. Thickness of the coating is uniform, i.e., neither the decorative nor non-decorative areas are higher than the other, thereby not facilitating chipping of a higher area.

SUMMARY OF THE INVENTION

According to the present invention, there is provided a process which renders a decorative pattern visible within a baked coating produced by a heat-stable polymer coating composition. The process consists essentially of applying the heat-stable polymer coating composition either as a subsequent coat over or directly under an antioxidant composition which is arranged in a decorative pattern, wherein the antioxidant or its decomposition products diffuse into the coat and either by reacting with components of the coating, by catalyzing reactions within the coating or by itself renders, upon baking, the decorative pattern visible within the coating produced by the heat-stable coating composition.

DETAILED DESCRIPTION OF THE INVENTION

Although any of the compounds described within this application can be utilized in compositions involved in the process, when cookware is involved only Food and Drug Administration approved compounds should be used.

A decorative pattern is any image, picture, design, configuration, or illustration which can be formed by any conventional method of applying ink.

A heat-stable polymer composition consists of at least one heat-stable polymer and a liquid carrier.

A heat-stable polymer is a polymer which is not affected by temperatures above 300° C which would decompose, oxidize, or otherwise adversely affected most organic compounds. Some examples of heat-stable polymers are silicones, polysulfides, polymerized parahydroxy benzoic acid, polysulfones, polyimides, polyamides, polysulfonates, polysulfonamides, H-resins (sold by Hercules Corporation), and fluorocarbons. One or more heat-stable polymers can be present in the composition of this invention.

The preferred heat-stable polymers are fluorocarbons because of their high temperature stability and release properties. The fluorocarbon polymers used are those of hydrocarbon monomers completely substituted with fluorine atoms or a combination of fluorine and chlorine atoms. Included in this group are perfluoroolefin polymers such as polytetrafluoroethylene (PTFE) and co-polymers of tetrafluoroethylene and hexafluoropropylene in all monomer unit weight ratios, fluorochlorocarbon polymers such as polymonochlorotrifluoroethylene, and copolymers of tetrafluoroethylene and perfluoroalkyl vinyl ethers. Mixtures of these can also be used.

The heat-stable polymer is ordinarily present in the composition at a concentration of 25% through 95%, preferably 70% through 90%, by weight of the total solids present in the composition.

Although a dry flour or powder of a heat-stable polymer can be used and a liquid carrier provided separately, a polymer in the form of an aqueous surfactant-stabilized dispersion is preferred for its stability and because it is most easily obtained in that form. Dispersions of heat-stable polymers in organic liquids such as alcohols, ketones, aliphatics, or aromatic hydrocarbons, or mixtures of these, can also be used. In either case, the liquid generally serves as the carrier for the composition.

If desired, a colorant may be present in the heat-stable polymer composition. A colorant is any compound which changes color when oxidized. Carbon and carbonaceous residues are examples of colorants.

For the purpose of this invention, a reaction such as oxidation of carbon black to carbon dioxide, in which a solid is oxidized to a fugitive gas, the solid thereby vanishing from the composition, is considered a color change.

Carbon can be present in concentrations up to 40% based on the weight of total solids of the composition, preferably in concentrations of 0.5-10%.

Carbonaceous residues are produced by decomposition or partial oxidation of organic compounds, which includes organometallic compounds. Organic compounds are normally present in coating compositions to serve as dispersants, coalescing agents, viscosity builders, etc., or they can be added to serve as colorants.

Although absolute amounts of carbonaceous residues in the heat-stable polymer coating are usually extremely small, nevertheless, they give a definite coloration to a baked coating.

Examples of organic compounds which produce carbonaceous residues are polymers of ethylenically unsaturated monomers, which depolymerize, and whose depolymerization products vaporize, in the temperature range of from 150° below the fusion temperature to about the heat-stable polymer's decomposition temperature.

"Depolymerization" means degradation of a polymer to the point at which the degradation products are volatile at the temperatures encountered in curing the coat. The degradation products can be monomers, dimers, or oligomers.

"Vaporize" means volatilization of the degradation products and their evaporation from the film.

Usually the polymers of ethylenically unsaturated monomers contain one or more monoethylenically unsaturated acid units.

Representatives of these ethylenically unsaturated monomers are alkyl acrylates and methacrylates having 1 to 8 carbon atoms in the alkyl group, styrene, 2-methyl styrene, vinyl toluene and glycidyl esters of 4 to 14 carbon atoms.

Representative of the monoethylenically unsaturated acids are acrylic acid, methacrylic acid, fumaric acid, itaconic acid, and maleic acid (or anhydride).

The polymer of an ethylenically unsaturated monomer which produces a carbonaceous residue can be present as a coalescing agent in the composition at a concentration of about 3% through 60% by weight of total heat-stable polymer and residue producing polymer.

The heat-stable polymer composition can be pigmented or unpigmented. Any pigment or combination of pigments ordinarily used in this sort of composition can be used. Typical of these pigments are titanium dioxide, aluminum oxide, silica, cobalt oxide, iron oxide, etc. The total amount of pigment ordinarily present is at concentrations of up to 40% by weight of the total solids in the composition.

The composition of this invention can contain mica particles, mica particles coated with pigment, and glass and metal flakes. These particles and flakes have an average longest dimension of 10 to 100 microns, preferably 15-50 microns, with no particles or flakes having a longest dimension of more than about 200 microns. Particle and flake size is measured optically against a standard.

The mica particles coated with pigment preferred for use are those described in U.S. Pat. No. 3,087,827, granted to Klenke and Stratton, and U.S. Pats. 3,087,828 and 3,087,829 granted to Linton. The disclosures of these patents are incorporated into this specification to describe the various coated micas and how they are prepared.

The mica particles described in these patents are coated with oxides or hydrous oxides of titanium, zirconium, aluminum, zinc, antimony, tin, iron, copper, nickel, cobalt, chromium, or vanadium. Titanium dioxide coated mica is preferred because of its availability. Mixtures of coated micas can also be used.

Representative of metal flake which can be used are aluminum flake, stainless steel flake, nickel flake, and bronze flake. Mixtures of flake can also be used.

The mica particles, coated mica particles, or glass and metal flake are ordinarily present in coating compositions at a concentration of about 0.2-20% by weight of total solids.

The composition can also contain such conventional additives as flow control agents, surfactants, plasticizers, coalescing agents, etc., as seem necessary or desirable. These additives are added for reasons, in ways and in amounts known to artisans.

The amount of total solids in the composition will be governed by the substrate to which the composition is to be applied, method of application, curing procedure, and like factors. Ordinarily, the composition will contain 10% through 80% by weight of total solids; but preferably 30%-50%.

The antioxidant composition must include one or more antioxidant compounds and a suitable carrier and can include color enhancers, viscosity builders or thickeners, wetting agents, pigments, decomposable resins and polymers, heat-stable resins and polymers, neutralizers, liquid carriers, and other adjuncts.

Color enhancers are heat-unstable organic ompounds which decompose to produce colorants, thus enhancing the contrast between decorative pattern and background. Examples of color enhancers are sugar, styrene, starch, fatty acid, and glycerides.

Polytetrafluoroethylene and other heat-stable polymers are examples of viscosity builders or thickeners. Preferably the same heat-stable polymer utilized in the coating composition is utilized as the viscosity builder or thickener.

Examples of pigment are carbon black, iron oxide, cobalt oxide, and titanium dioxide. When pigment is present in the antioxidant composition, at least an equal amount, preferably three to ten times as much, of heat-stable polymer will, preferably, also be present.

An antioxidant is any compound that opposes oxidation under fabrication baking conditions which are required for manufacture of heat-stable polymer coated articles. The antioxidant can oppose oxidation either by itself or through its decomposition or oxidation products. All of these compounds should yield at least .01 part by weight, based on solids and expressed as the acid, of the corresponding free acids or anhydrides when the compound is decomposed and/or oxidized during fabrication baking. The preferred yield range is .1 to 1 part by weight.

Preferred antioxidants are compounds containing phosphorus, sulfur, boron or any combination of the above. The most common examples include the ortho-, meta-, pyro-acids; neutral and basic salts; esters are generally their organic derivatives including organometallic derivatives.

More preferred antioxidants are phosphoric acid, its decomposable salts, containing ammonia or amines, 2-ethylhexyldiphenyl phosphate, magnesium glycerophosphate, calcium glycerophosphate, and iron glycerophosphate.

There must be either a colorant in the heat-stable polymer composition or a color enhancer in the antioxidant composition when the antioxidant compound itself does not supply, as part of its decomposition products, a color enhancer.

The anitoxidant is dissolved or dispersed in suitable carriers for the particular oxidation catalyst.

An antioxidant can also be present within the heat-stable polymer coating composition. The antioxidant of the coating composition can either be the same or different from the antioxidant used in the antioxidant composition.

The antioxidant composition can be applied by any conventional method of applying ink. The preferred methods are to apply the antioxidant composition by "Intaglio" offset, e.g., using a Tampoprint ® machine sold by Dependable Machine Co., Inc., or silk screening.

The heat-stable polymer coating composition is applied to a thickness of about 0.5–5 mils (dry) and baked for a time and at a temperature sufficient to fuse or cure the heat-stable polymer being used.

The baking temperature range of the process is dependent mainly upon which heat-stable polymer composition is utilized. The process of this invention is utilizable upon any conventionally used substrate. The substrate may be coated with a primer prior to the application of the oxidation catalyst composition. The substrate is preferably pre-treated prior to the application of any coating composition. Pre-treatment methods include flamespraying, frit-coating, grit-blasting, and acid-or alkali-treating. A metal substrate is preferably pretreated by grit-blasting, by flame-spraying of a metal or a metal oxide, or by frit-coating, although the compositions can be applied successfully to phosphated, chromated or untreated metal. A glass substrate is preferably grit-blasted or frit-coated.

A primer composition, if desired, can be applied either under or over the antioxidant composition composition. The primer composition can be applied in any of the customery ways, which include spraying, roller coating, dipping, and doctor blading. Spraying is generally the method of choice.

In other words, included in the proccess are various sequences of applying the compositions to the substrate, for example,
1. first the antioxidant composition, and then the coating composition;
2. first the coating composition, and then the antioxidant composition;
3. first a primer composition, then the antioxidant composition, and then the coating composition;
4. first the antioxidant composition, then a primer composition, and then the coating composition; or
5. first a primer composition, then the coating composition, and then the antioxidant composition.

The primer composition can be any conventionally used primer coating. An example is the silica-perfluorocarbon primer disclosed by E. J. Welch in U.S. Patent application Ser. No. 405,798, filed Oct. 12, 1973, now abandoned.

The process of this invention is useful for any article that may use a heat-stable polymer surface; examples are cookware, especially fry pans, bearings, valves, wire, metal foil, boilers, pipes, ship bottoms, oven liners, iron soleplates, waffle irons, ice cube trays, snow shovels, saws, files and drills, hoppers, and other industrial containers and molds.

The following example is illustrative of the invention. All parts are by weight unless otherwise stated.

EXAMPLE 1

Prepare a heat-stable polymer composition as follows:
a. Add, slowly, 100.66 parts by weight of deionized water to 657 parts by weight of an aqueous dispersion of polytetrafluoroethylene containing 6% by weight isooctylphenoxypolyethoxyethanol.

b. Add, slowly and with stirring, to the product of (a) 115.75 parts be weight of an aqueous dispersion, 40% by weight solids, of a methyl methacrylate/ethyl acrylate/methacrylic acid polymer having a monomer weight ratio of 39/57/4.

c. Prepare a black mill base by mixing and then pebble milling:

|  | PARTS BY WEIGHT |
|---|---|
| Carbon | 20.0 |
| Aluminosilicate pigment | 10.0 |
| Sodium polynaphthalene sulfonate | 3.0 |
| Water | 67.0 | d. Prepare a titanium dioxide dispersion by mixing and pebble milling:

|  | PARTS BY WEIGHT |
|---|---|
| Titanium dioxide | 45.0 |
| Deionized water | 54.5 |
| Sodium polynaphthalene sulfonate | .5 | e. Prepare a cobalt oxide dispersion by mixing and pebble milling:

|  | PARTS BY WEIGHT |
|---|---|
| Cobalt oxide | 45.0 |
| Deionized water | 55.0 | f. Add in order, slowly and with sitrring, to the product of (b):

|  | PARTS BY WEIGHT |
|---|---|
| Black mill base | 10.72 |
| Titanium dioxide dispersion | 81.21 |
| Cobalt oxide dispersion | 9.74 | g. Prepare a solvent-surfactant by mixing together:

|  | PARTS BY WEIGHT |
|---|---|
| Triethanolamine | 25.88 |
| Toluene | 46.36 |
| Butyl carbitol | 15.63 |
| Oleic acid | 12.13 | h. Add slowly, with stirring, 109.83 parts by weight of the solvent-surfactant to the product of (f).

i. Prepare a phosphoric acid composition consisting of:

|  | PARTS BY WEIGHT |
|---|---|
| Phosphoric acid (85%) | 1.0 |
| Triethanolamine | 5.0 | j. Add a sufficient amount of the phosphoric acid composition to the product of (g) to produce a coating composition containing 1% phosphoric acid composition. Prepare four different antioxidant compositions (A.C.) as follows:

A.C. (1) 10% by weight ammonium sulfamate in deionized water.

A.C. (2) 10% by weight boric acid in deionized water.

A.C. (3) 10% by weight ammonium sulfate in deionized water.

A.C. (4) 10% by weight ammonium phospate in deionized water.

Prepare two aluminum panels by frit-coating and priming according to the directions in Example 3 of U.S. Patent application Ser. No. 405,798, filed Oct. 12, 1973, now abandoned.

Draw four lines, using a different antioxidant composition for each line, on both panels. Allow the antioxidant compositions to dry.

Spray the coating composition of (j) to a thickness of 1 mil (dry) on both panels and dry in air.

Place the air-dried panels into an oven at 430° C. Remove one panel after it has been at 430° for 5 minutes. Remove the other panel after it has been at 430° for 15 minutes.

The panels' background color remains the same while the areas over the line are considerably darker than the background.

EXAMPLE 2

Prepare the coating composition of Example 1; however, in step (j) add a sufficient amount of the phosphoric acid composition to produce a coating composition containing 2% phosphoric acid composition.

Per 100 parts of this coating composition add 3.6 parts of TiO$_2$ coated mica particles (Afflair ® NF-152-D sold by E. I. du Pont de Nemours and Company)

Prepare a primer composition by mixing together the following:

|  |  | PARTS |
|---|---|---|
| Deionized water |  | 154.11 |
| Aqueous dispersion of PTFE, 60% by weight solids |  | 1105.03 |
| Colloidal silica sol (ludox ® AM sold by E. I. du Pont de Nemours and Company |  | 761.56 |
| Toluene |  | 112.25 |
| Diethylene glycol monobutyl ether |  | 26.50 |
| Silicone (60% by weight solids in xylene) |  | 67.20 |
| Triethanolamine |  | 22.65 |
| Oleic acid |  | 11.32 |
| White mill base |  |  |
| TiO$_2$ | 45% |  |
| Demineralized water | 54.5% |  |
| Sodium polynaphthanene sulfonate | .5% |  |
| Prepare an antioxidant composition consisting of |  |  |
| Phosphoric acid (85%) |  | 1 |
| Triethanolamine |  | 5 |

Prepare an aluminum panel by frit-coating as in Example 1.

Spray the primer composition to a thickness of 0.3 mil (dry) and dry in air.

Stamp, in a decorative pattern, the antioxidant composition on the aluminum panel.

Spray the coating composition to a thickness of 1 mil (dry) on the panel and dry in air.

Bake the air-dried panel at 430° C for 10 minutes.

The areas of the coating over the antioxidant composition remain dark, while the other area of the coating becomes lighter, thereby producing a dark decorative pattern upon a light background.

What is claimed is:

1. A process for preparing a decorative coating on a substrate, comprising the following steps, with (a) and (b) performed in any order:
   a. applying to a substrate a composition comprising
      1. a heat-stable polymer;
      2. a colorant;
      3. optionally, an antioxidant; and
      4. a liquid carrier; and
   b. applying to a substrate, in a decorative pattern, a composition comprising
      1. an antioxidant;
      2. a liquid carrier; and
      3. optionally, one or more of a heat-unstable organic compound which decomposes to produce a colorant;

and then heating the resulting coating to the heat-stable polymer fusion temperature wherein the heat stable polymer composition is stable at temperatures above 300° C and the heat-stable polymer is a silicone, polysulfide, polymerized p-hydroxy-benzoic acid, a polysulfone, a polyimide, a polyamide, a polysulfonate, a polysulfonamide, a fluorocarbon polymer, or a mixture thereof.

2. The process of claim 1 wherein the heat-stable polymer in (a) (1) is of polymerized hydrocarbon monomers completely substituted with fluorine atoms or a combination of fluorine atoms and chlorine atoms.

3. The process of claim 2 wherein the heat-stable polymer in (a) (1) is polytetrafluoroethylene or a copolymer of tetrafluoroethylene and hexafluoropropylene.

4. The process of claim 1 wherein the antioxidant in (b) (1) is a phosphorus, sulfur or boron compound.

5. The process of claim 4 wherein the antioxidant in (b) (1) is an acid, salt or ester containing phosphorus, boron or sulfur, or an organic derivative thereof.

6. The process of claim 5 wherein the antioxidant in (b) (1) is phosphoric acid or a decomposable salt thereof, 2-ethylhexyldiphenyl phosphate, or a glycerophosphate of magnesium, calcium or iron.

7. The process of claim 1 where the colorant in (a) (2) is carbon black, a carbonaceous residue a substance which leaves a carbonaceous residue after the fusion step has been performed, or mixtures thereof.

8. The process of claim 1 wherein the heat-stable polymer in (a) (1) is PTFE, the colorant in (a) (2) is carbon black, a substance which leaves a carbonaceous residue after the fusion step has been performed, or a mixture thereof, and the antioxidant in (b) (2) is phosphoric acid.

9. An article bearing a decorative coating, prepared according to the process of Claim 16.

10. An article bearing a decorative coating, prepared according to the process of claim 2.

11. An article bearing a decorative coating, prepared according to the process of claim 3.

12. An article bearing a decorative coating, prepared according to the process of claim 4.

13. An article bearing a decorative coating, prepared according to the process of claim 5.

14. An article bearing a decorative coating, prepared according to the process of claim 6.

15. An article bearing a decorative coating, prepared according to the process of claim 7.

16. An article bearing a decorative coating, prepared according to the process of claim 8.

* * * * *